United States Patent
Nossik et al.

(10) Patent No.: US 10,284,557 B1
(45) Date of Patent: May 7, 2019

(54) SECURE DATA PROXY FOR CLOUD COMPUTING ENVIRONMENTS

(71) Applicant: EMC IP Holding Company LLC, Hopkinton, MA (US)

(72) Inventors: Misha Nossik, Ottawa (CA); Lejin Du, Kanata (CA); Murray McCulligh, Ottawa (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 258 days.

(21) Appl. No.: 15/354,486

(22) Filed: Nov. 17, 2016

(51) Int. Cl.
*H04L 29/06* (2006.01)

(52) U.S. Cl.
CPC ...... *H04L 63/0884* (2013.01); *H04L 63/0281* (2013.01); *H04L 63/0428* (2013.01); *H04L 63/06* (2013.01)

(58) Field of Classification Search
CPC ............. H04L 63/0884; H04L 63/0281; H04L 63/0428; H04L 63/06
USPC ........................................................ 713/153
See application file for complete search history.

(56) References Cited

U.S. PATENT DOCUMENTS

| | | |
|---|---|---|
| 6,577,734 B1 | 6/2003 | Etzel et al. |
| 7,814,318 B1 | 10/2010 | Perlman et al. |
| 8,417,747 B1 | 4/2013 | Hayden et al. |
| 8,650,657 B1 | 2/2014 | Shankar et al. |
| 8,898,402 B1 | 11/2014 | Stronge |
| 9,071,429 B1 | 6/2015 | Roth et al. |

(Continued)

FOREIGN PATENT DOCUMENTS

| | | |
|---|---|---|
| CN | 103810046 A | 5/2014 |
| CN | 103870314 A | 6/2014 |

(Continued)

OTHER PUBLICATIONS

U.S. Appl. No. 14/575,080, filed in the name of R. Wallner et al. on Dec. 18, 2014 and entitled "Virtual Network Storage Function Layer Comprising One or More Virtual Network Storage Function Instances."

(Continued)

*Primary Examiner* — Michael Pyzocha
*Assistant Examiner* — Zoha Piyadehghibi Tafaghodi
(74) *Attorney, Agent, or Firm* — Ryan, Mason & Lewis, LLP (57) ABSTRACT

An apparatus in one embodiment comprises a plurality of host devices configured to support execution of applications on behalf of one or more tenants of cloud infrastructure. The apparatus further comprises a secure data proxy implemented utilizing at least one of the host devices. The secure data proxy comprises non-persistent storage configured to store data required for execution of at least one of the applications. The data is obtained by the secure data proxy from persistent storage in a storage system external to the cloud infrastructure. The secure data proxy is configured to perform cryptographic operations in conjunction with transfer of the data between the persistent storage of the external storage system and the non-persistent storage of the secure data proxy. The secure data proxy may be further configured to perform deduplication operations in conjunction with transfer of the data between the persistent storage and the non-persistent storage.

20 Claims, 6 Drawing Sheets

(56) References Cited

U.S. PATENT DOCUMENTS

| | | | |
|---|---|---|---|
| 9,407,664 | B1 | 8/2016 | Banerjee |
| 9,779,269 | B1* | 10/2017 | Perlman ............... G06F 21/78 |
| 2003/0002668 | A1 | 1/2003 | Graunke et al. |
| 2005/0018853 | A1 | 1/2005 | Lain et al. |
| 2006/0282666 | A1 | 12/2006 | Kim |
| 2006/0288232 | A1 | 12/2006 | Ho et al. |
| 2007/0226809 | A1 | 9/2007 | Ellard |
| 2007/0245410 | A1 | 10/2007 | Perlman et al. |
| 2008/0256607 | A1 | 10/2008 | Janedittakarn et al. |
| 2009/0110191 | A1 | 4/2009 | Sanvido et al. |
| 2010/0235649 | A1 | 9/2010 | Jeffries et al. |
| 2011/0158405 | A1 | 6/2011 | Choi et al. |
| 2011/0276713 | A1 | 10/2011 | Brand |
| 2011/0283113 | A1 | 11/2011 | Moffat et al. |
| 2012/0072716 | A1 | 3/2012 | Hu et al. |
| 2012/0173488 | A1 | 7/2012 | Spielberg et al. |
| 2012/0174113 | A1 | 7/2012 | Pohlmann |
| 2012/0180039 | A1 | 7/2012 | Bravery et al. |
| 2012/0278621 | A1 | 11/2012 | Woloszyn |
| 2012/0284528 | A1 | 11/2012 | Orovitz |
| 2013/0145006 | A1 | 6/2013 | Tammam |
| 2013/0305057 | A1 | 11/2013 | Greco et al. |
| 2013/0322621 | A1 | 12/2013 | Yoon et al. |
| 2014/0006802 | A1 | 1/2014 | Cachin et al. |
| 2014/0025963 | A1 | 1/2014 | Subramanian |
| 2014/0068257 | A1 | 3/2014 | Burckard |
| 2014/0122866 | A1* | 5/2014 | Haeger ................ H04L 63/061 <br> 713/153 |
| 2014/0274408 | A1 | 9/2014 | Dave |
| 2014/0283010 | A1* | 9/2014 | Rutkowski ............ G06F 21/31 <br> 726/18 |
| 2014/0317618 | A1 | 10/2014 | Behera et al. |
| 2014/0351605 | A1 | 11/2014 | De Atley et al. |
| 2014/0359309 | A1 | 12/2014 | Cachin et al. |
| 2014/0366155 | A1 | 12/2014 | Chang et al. |
| 2015/0007274 | A1* | 1/2015 | Chang ................... G06F 21/62 <br> 726/4 |
| 2015/0019870 | A1 | 1/2015 | Patnala et al. |
| 2015/0058861 | A1 | 2/2015 | Zheng et al. |
| 2015/0074058 | A1 | 3/2015 | Zhao et al. |
| 2015/0120928 | A1* | 4/2015 | Gummaraju ........ H04L 67/1008 <br> 709/226 |
| 2015/0331635 | A1* | 11/2015 | Ben-Shaul ............ G06F 9/5061 <br> 711/120 |
| 2016/0269371 | A1 | 9/2016 | Coimbatore |

FOREIGN PATENT DOCUMENTS

| | | |
|---|---|---|
| CN | 104104513 A | 10/2014 |
| EP | 1414181 A1 | 4/2004 |

OTHER PUBLICATIONS

SYSDIG.ORG, "Universal System Visibility with Native Container Support," 2015, 3 pages.

Encomium to Technology, "Dissecting Docker Security—Part 1," http://goo.gl/35Jr9D, Aug. 12, 2015, 3 pages.

Encomium to Technology, "Aesthetics of Linus Security Modules," http://goo.gl/x12gJD, Aug. 12, 2015, 3 pages.

Netlink, "Linux Programmer's Manual," http://man7.org/linux/man-pages/man7/netlink.7.html, Jan. 10, 2015, 7 pages.

U.S. Appl. No. 14/752,153, filed in the name of R. Wallner et al. on Jun. 26, 2015 and entitled "Coordinated Resource Allocation Between Container Groups and Storage Groups."

U.S. Appl. No. 14/819,920, filed in the name of Radia Perlman on Aug. 6, 2015 and entitled "Storage System Comprising Per-Tenant Encryption Keys Supporting Deduplication Across Multiple Tenants."

U.S. Appl. No. 14/820,026, filed in the name of Vaibhav Khanduja et al. on Aug. 6, 2015 and entitled "Provisioning Isolated Storage Resource Portions for Respective Containers in Multi-Tenant Environments."

U.S. Appl. No. 14/939,562, filed in the name of Vaibhav Khanduja on Nov. 12, 2015 and entitled "Intrusion Detection for Storage Resources Provisioned to Containers in Multi-Tenant Environments."

U.S. Appl. No. 15/268,788, filed in the name of Misha Nossik et al. on Sep. 19, 2016 and entitled "Secure Data Access in Cloud Computing Environments."

U.S. Appl. No. 15/075,858, filed in the name of Misha Nossik et al. on Mar. 21, 2016 and entitled "Security Layer for Containers in Multi-Tenant Environments."

Clearsky Data, "Welcome to the Global Storage Network Plug in," Data Sheet, 2016, 2 pages.

Velostrata Inc., "Velostrata Move Production Workloads to a Public Cloud in Minutes," Data Sheet, 2016, 2 pages.

* cited by examiner

SECURE DATA PROXY FOR CLOUD COMPUTING ENVIRONMENTS

FIELD

The field relates generally to information processing systems, and more particularly to information processing systems comprising cloud infrastructure.

BACKGROUND

Information processing systems increasingly utilize reconfigurable virtual resources to meet changing user needs in an efficient, flexible and cost-effective manner. For example, cloud computing environments implemented using various types of virtualization techniques are known. These illustratively include operating system level virtualization techniques such as Linux containers. Such containers may be used to provide at least a portion of the cloud infrastructure of a given information processing system. Other types of virtualization such as virtual machines implemented using a hypervisor can additionally or alternatively be used. However, significant challenges remain in implementation of cloud infrastructure. For example, an enterprise utilizing a public cloud for application execution may have to copy private data needed by the application into persistent storage of the public cloud. This can create security concerns for some enterprises relating to the transferred private data. Moreover, excessive amounts of system bandwidth and other resources are often expended when transferring large data sets into the public cloud for use in application execution.

SUMMARY

Illustrative embodiments provide enhanced security for private data of an enterprise storage system that utilizes cloud infrastructure for application execution. For example, some embodiments provide arrangements in which application execution in a public cloud does not require persistent storage of private data in the public cloud. Such arrangements can advantageously alleviate any security concerns that enterprises might otherwise have if they had to transfer their private data into persistent storage of a public cloud. Enterprises can therefore obtain the numerous benefits associated with cloud computation while also ensuring that their private data remains secure within an enterprise storage system and is never persistently stored within the public cloud. In addition, these arrangements can be configured to ensure that enterprise data is transferred only temporarily on an as-needed basis and therefore in a manner that significantly reduces the amounts of system bandwidth and other resources that might otherwise have been required by conventional techniques.

In one embodiment, an apparatus comprises a plurality of host devices configured to support execution of applications on behalf of one or more tenants of cloud infrastructure. The apparatus further comprises a secure data proxy implemented utilizing at least one of the host devices. The secure data proxy comprises non-persistent storage configured to store data required for execution of at least one of the applications. The data is obtained by the secure data proxy from persistent storage in a storage system external to the cloud infrastructure. The secure data proxy is configured to perform cryptographic operations in conjunction with transfer of the data between the persistent storage of the external storage system and the non-persistent storage of the secure data proxy. The secure data proxy may be further configured to perform deduplication operations in conjunction with transfer of the data between the persistent storage and the non-persistent storage.

Illustrative embodiments can facilitate the use of cloud computing by enterprises by allowing applications to execute in a public cloud while the data utilized by those applications remains securely stored in an enterprise storage system and is not persistently stored in the public cloud. Moreover, system resources expended on data transfer between the public cloud and the enterprise storage system are significantly reduced. Numerous alternative arrangements are possible.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary information processing systems and associated host devices, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Such systems are considered examples of what are more generally referred to herein as cloud computing environments.

Figure 1:
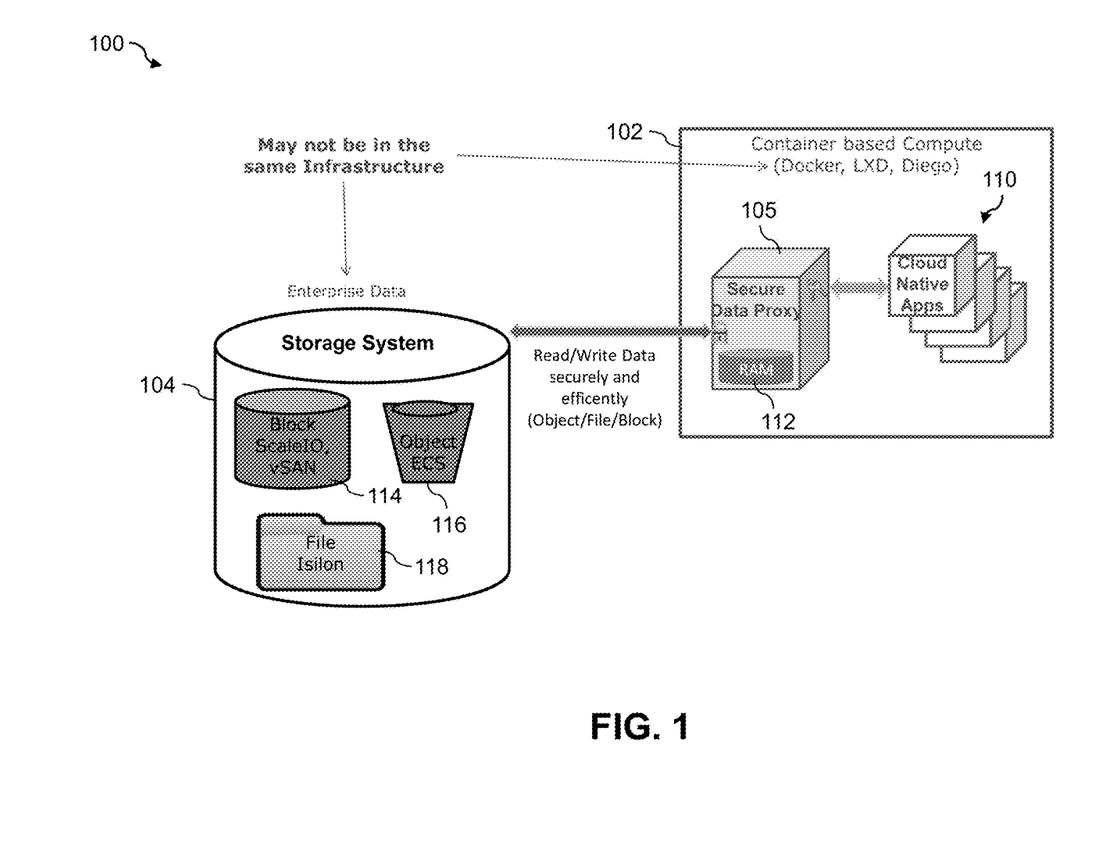
FIG. 1 is a block diagram of an information processing system comprising a secure data proxy in an illustrative embodiment.

FIG. 1 shows an information processing system 100 comprising a public cloud 102 implementing container-based compute functionality. The public cloud 102 is coupled to an enterprise storage system 104 that is illustratively implemented in different infrastructure. The public cloud 102 and other clouds referred to herein are illustratively implemented by cloud infrastructure comprising one or more processing platforms. Although the present embodiment includes a public cloud 102, the term "cloud" as used herein is intended to be more broadly construed and may comprise a public cloud, a private cloud, a hybrid cloud or combinations of multiple clouds of different types.

The enterprise storage system 104 is assumed to be associated with a business, organization or other entity that is distinct from a cloud provider that implements the public cloud 102. The enterprise storage system 104 is therefore considered separate from the public cloud 102. Other types of separation between the enterprise storage system 104 and the public cloud 102 may be used in other embodiments. The enterprise storage system 104 is further assumed to communicate with the public cloud 102 over at least one communication network which is not explicitly shown in the figure. The enterprise storage system 104 is configured to store enterprise data under the control of its associated entity.

The enterprise storage system 104 is an example of what is more generally referred to as an "external storage system," as it is assumed to be external to the infrastructure that implements the public cloud 102. In other embodiments, the enterprise storage system 104 may be implemented at least in part within the same infrastructure as the public cloud 102. For example, it may be implemented at least in part as part of a private cloud within that same general infrastructure. Such a private cloud may nonetheless be considered to be external to the public cloud 102 and its associated cloud infrastructure.

The public cloud 102 in the present embodiment is assumed to comprise a plurality of host devices configured to support execution of applications on behalf of one or more tenants of the cloud infrastructure. Such host devices are not explicitly shown in the figure. The public cloud 102 further comprises a secure data proxy 105 implemented utilizing at least one of the host devices. The secure data proxy 105 comprises non-persistent storage configured to store data required for execution of a plurality of cloud native applications 110. The non-persistent storage of the secure data proxy 105 in this embodiment more particularly comprises random access memory (RAM) 112, although other types of non-persistent storage can be used in other embodiments.

The term "non-persistent storage" as used in this context herein illustratively refers to volatile memory or other types of storage resources that are not persisted within the public cloud 102 after the cloud native applications 110 are terminated. This is in contrast to the storage resources of the enterprise storage system 104 that provide persistent storage for the data processed by the cloud native applications 110. Persistent storage as that term is used herein illustratively refers to non-volatile memory such as flash memory or other types of non-volatile storage resources such as disk-based storage resources.

The host devices of the public cloud 102 are more particularly assumed to comprise respective container host devices. The cloud native applications 110 execute in respective application containers implemented utilizing the container host devices. The container host devices may comprise Docker containers, LXD containers, Cloud Foundry Diego-based containers or other types of containers.

The secure data proxy 105 is configured to obtain the data required for execution of the cloud native applications 110 from persistent storage in the enterprise storage system 104 external to the cloud infrastructure that implements public cloud 102.

The persistent storage of the enterprise storage system 104 illustratively includes at least one storage platform implementing block storage 114, object storage 116 and file storage 118, although additional or alternative types of persistent storage can be used in other embodiments. The block storage may be implemented using a software-defined storage product such as ScaleIO™ to provide a virtual storage area network (vSAN). The object storage 116 may be implemented using a cloud storage product such as Elastic Cloud Storage (ECS). The file storage 118 may be implemented using Isilon® platform nodes and associated accelerators in the S-Series, X-Series and NL-Series product lines. The above-mentioned storage products are from EMC Corporation of Hopkinton, Mass.

Different combinations of these and numerous other storage products can also be used in implementing a given storage platform in an illustrative embodiment. Additional examples of storage products that may be used in other embodiments include VNX® and Symmetrix VMAX® storage arrays, flash-based storage arrays such as DSSD™ and XtremIO™, object-based storage products such as Atmos®, and software-defined storage products such ViPR®, all from EMC Corporation.

In the present embodiment, the secure data proxy 105 is configured to control transfer of read/write data between the public cloud 102 and the enterprise storage system 104. This data transfer is assumed to encompass data of multiple distinct types, including blocks, objects and files from the respective block storage 114, object storage 116 and file storage 118 of the enterprise storage system 104.

The data is transferred securely and efficiently utilizing the functionality of the secure data proxy 105. For example, the secure data proxy 105 is illustratively configured to perform cryptographic operations in conjunction with transfer of the data between the persistent storage 114, 116 and 118 of the enterprise storage system 104 and the non-persistent RAM 112 of the secure data proxy 105. The secure data proxy 105 can additionally or alternatively be configured to perform deduplication operations in conjunction with transfer of the data between the persistent storage 114, 116 and 118 of the enterprise storage system 104 and the non-persistent RAM 112 of the secure data proxy.

The data transfer control provided by the secure data proxy 105 in the present embodiment is assumed to be bidirectional. Accordingly, the secure data proxy 105 interacts with the enterprise storage system 104 to transfer the data required for execution of the cloud native applications 110 from the persistent storage 114, 116 and 118 into the non-persistent RAM 112 of the secure data proxy 105 and also interacts with the enterprise storage system 104 to transfer corresponding modified data back from the non-persistent RAM 112 of the secure data proxy 105 into the persistent storage 114, 116 and 118 of the enterprise storage system 104.

In the FIG. 1 embodiment, the secure data proxy 105 runs in the public cloud 102 and illustratively provides a RAM-based data service to the cloud native applications 110. The data service is configured to ensure that the data required by the cloud native applications 110 is never stored in persistent storage of the public cloud 102. Instead, the data is stored persistently in the block storage 114, object storage 116 and/or file storage 118 of the enterprise storage system 104, and provided to the cloud native applications 110 as needed.

As a more particular example, the secure data proxy 105 in some implementations of the information processing system 100 can be used to provide a premium data service enabling enterprise customers to run their workloads securely in containers of relatively untrusted "compute-only" public cloud infrastructures while avoiding wholesale migration of their data assets away from a trusted location. The trusted location may be a private cloud, but could encompass any combination of private, managed hosting, hybrid or trusted public locations. The secure data proxy 105 in such an arrangement may be illustratively configured such that only particular "hot" data would travel in real time to the compute-only cloud and would be processed in non-persistent RAM 112 for application use. Again, enterprise data in the compute-only public cloud would never be stored in persistent storage of that cloud.

The secure data proxy 105 can bring data from external storage in any desired location to applications running in any desired location. Moreover, the secure data proxy 105 can deliver the data securely and efficiently to the applications. Data encryption and deduplication functionality are illustratively implemented within the secure data proxy utilizing native formats such as blocks, objects or files. As a result, consumption of system bandwidth and other resources associated with data transfer are significantly reduced. The secure data proxy 105 can be configured to aggregate data from multiple storage sources and distribute data to multiple storage destinations, accessing multiple distinct storage systems of different types, such as block storage systems, object storage systems and file storage systems.

The secure data proxy 105 can provide data to distributed applications efficiently and reliably. For example, each distributed application could run in multiple host devices in multiple locations or clouds. The secure data proxy 105 in such arrangements provides shared data locally to each running process of the distributed application, achieving both high data throughput and high data availability.

In addition, the secure data proxy 105 can enable enterprise data storage features at a container platform level. For example, the secure data proxy 105 in some embodiments has container level data visibility and controllability that enables various enterprise data storage features such as replication, snapshots and backups to be implemented at the container platform level.

Additional details regarding these and other features of an illustrative secure data proxy such as secure data proxy 105 of the FIG. 1 embodiment will now be described with reference to information processing system embodiments of FIGS. 2, 3 and 4.

Figure 2:
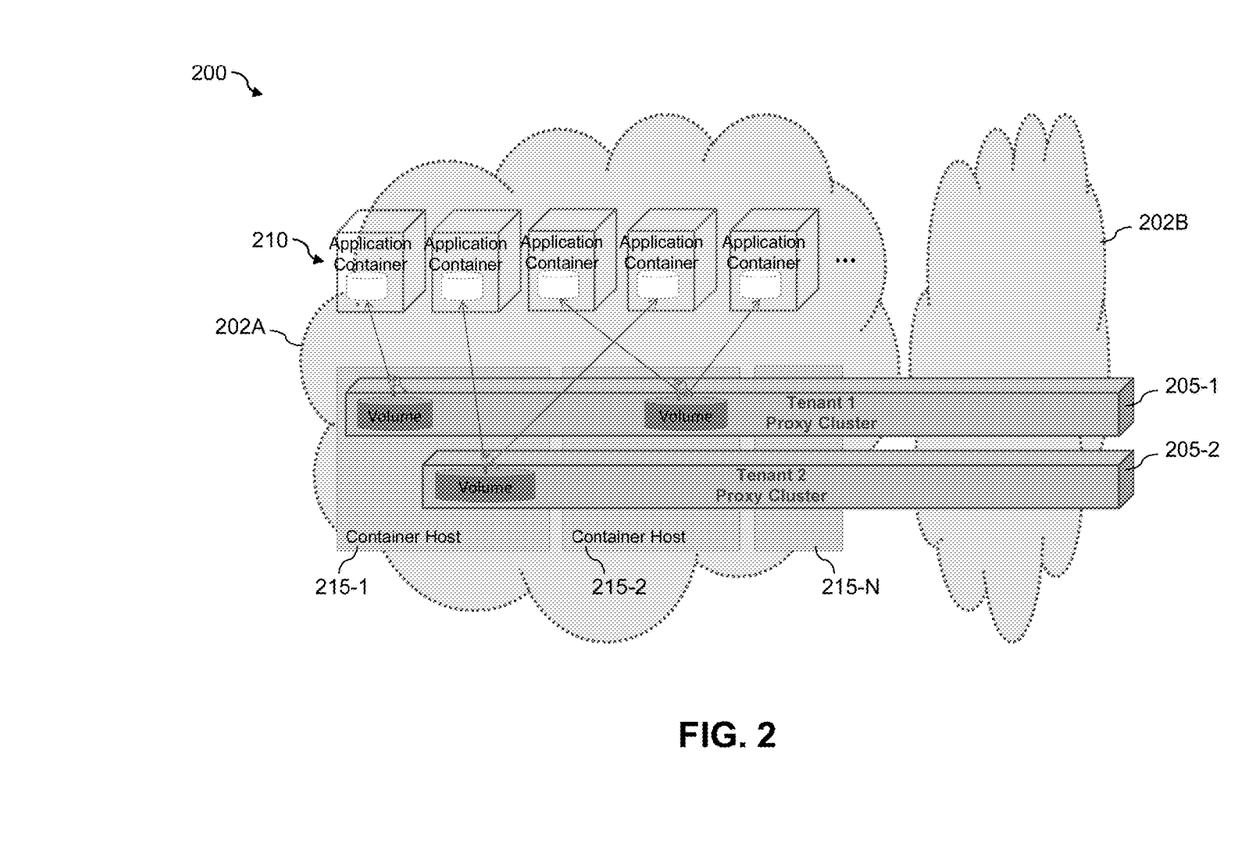
FIGS. 2, 3 and 4 are block diagrams of information processing systems comprising secure data proxies in respective other illustrative embodiments.

Referring now to FIG. 2, an information processing system 200 comprises a plurality of public clouds including at least public cloud 202A and public cloud 202B. Each of the public clouds 202 is assumed to comprise a plurality of host devices that are utilized to implement application containers 210, with different ones of the application containers 210 being implemented for different ones of a plurality of tenants of the public clouds 202. For example, public cloud 202A comprises container host devices 215-1, 215-2, . . . 215-N which support application containers 210. The public cloud 202B is assumed to comprise a similar arrangement of container host devices.

The information processing system 200 comprises first and second secure data proxies 205-1 and 205-2 dedicated to respective cloud tenants denoted Tenant 1 and Tenant 2. Each of these secure data proxies 205 is implemented in a distributed matter utilizing multiple container host devices in each of the public clouds 202.

The first secure data proxy 205-1 associated with Tenant 1 includes persistent storage comprising one or more storage volumes that are made accessible to only those of the application containers 210 that are associated with Tenant 1. Similarly, the second secure data proxy 205-2 associated with Tenant 2 includes persistent storage comprising one or more storage volumes that are made accessible to only those of the application containers 210 that are associated with Tenant 2. Additional secure data proxies can be provided for respective additional tenants of the public clouds 202 in a similar manner.

In this embodiment, each of the secure data proxies 205 more particularly comprises a clustered secure data proxy implemented utilizing a cluster of proxy containers provided by respective ones of the container host devices of the public clouds 202A and 202B. The applications executing in respective application containers 210 of respective ones of the container host devices 215 are each able to locally access the corresponding proxy container provided by that container host device.

A given one of the secure data proxies 205 is configured to mount one or more storage volumes from an external storage system and to expose at least portions of the one or more mounted storage volumes to one or more of the application containers 210 of the corresponding tenant.

It should be apparent that the secure data proxies 205 in the FIG. 2 embodiment are implemented on a per-tenant basis and extend in a distributed manner across container host devices of multiple public clouds 202. Such an arrangement is highly scalable and elastic so as to readily accommodate the varying storage and computation needs of individual tenants.

Figure 3:
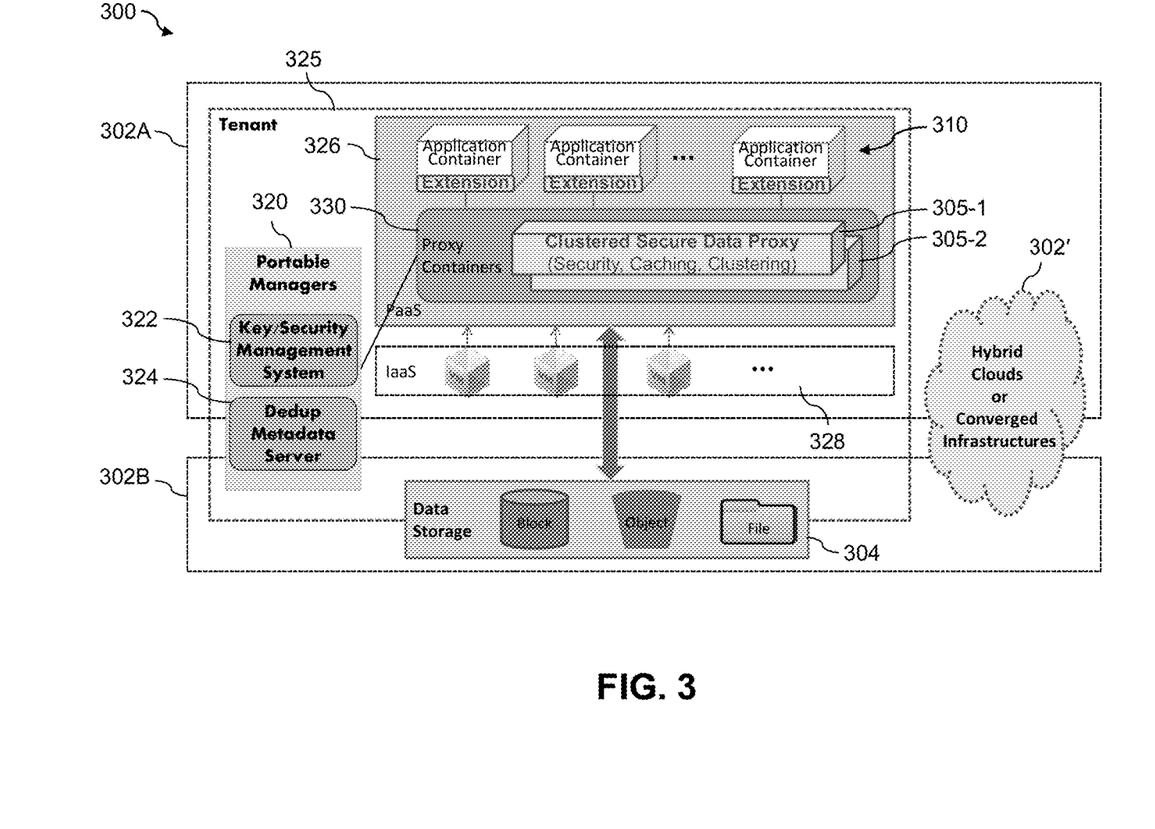

FIG. 3 shows another embodiment of an information processing system comprising a secure data proxy of the type described above. In this embodiment, information processing system 300 comprises a public cloud 302A and a private cloud 302B. The public and private clouds 302A and 302B are illustratively part of an arrangement of hybrid clouds or other types of converged infrastructures collectively denoted 302'.

The private cloud 302B includes a data storage system 304 of a particular tenant. The data storage system 304 comprises persistent storage including block storage, object storage and file storage of the tenant. The data storage system 304 may be viewed as another example of an "external" storage system as that term is broadly used herein.

The public cloud 302A includes clustered secure data proxies 305-1 and 305-2 both implemented for the particular tenant, although in other embodiments the clustered secure data proxies 305 can be associated with respective distinct tenants.

The public cloud 302A further comprises a plurality of application containers 310. Each of the application containers 310 comprises a proxy extension through which that application container communicates with a proxy container on a corresponding container host device of the public cloud 302A.

Also included in the system 300 is a set of portable managers 320 including a key/security management system 322 and a deduplication ("dedup") metadata server 324. The components are referred to as "portable" in this embodiment in that they are not implemented in or otherwise tied to any particular one of the clustered secure data proxies 305, but are instead implemented externally to the clustered secure data proxies 305. The key/security management system 322 and dedup metadata server 324 are examples of what are more generally referred to herein as a "key management system" and a "metadata server," respectively. In other embodiments, it is possible for at least portions of a key management system and a metadata server to be implemented at least in part internally to a secure data proxy.

The public cloud 302A further comprises for a given tenant 325 a Platform-as-a-Service (PaaS) layer 326 overlying an Infrastructure-as-a-Service (IaaS) layer 328. The IaaS layer 328 comprises a plurality of virtual machines (VMs) as shown. These VMs support the application containers 310 of the PaaS layer 326 as well as a plurality of proxy containers 330 of the PaaS layer 326.

Each of the clustered secure data proxies 305 is implemented utilizing multiple ones of the proxy containers 330 illustratively provided by respective ones of a plurality of container host devices of the public cloud 302A. The container host devices in this embodiment are assumed to correspond to respective ones of the VMs of the IaaS layer 328.

The key/security management system 322 is accessible to the clustered secure data proxies 305 of the tenant 325 and is configured to provide cryptographic keys to the clustered secure data proxies 305 for performing cryptographic operations in conjunction with transfer of data between the data storage system 304 and the public cloud 302A. The cryptographic keys illustratively comprise data encryption keys utilized for encrypting respective instances of at least one of blocks, objects and files of the data.

The dedup metadata server 324 is accessible to the clustered secure data proxies 305 of the tenant 325 and is configured to provide metadata to the clustered secure data proxies 305 for performing the cryptographic operations. The metadata may be encrypted under a key encryption key by the key/security management system 322.

The dedup metadata server 324 also supports deduplication operations performed by the clustered secure data proxies 305. For example, one or more of the deduplication operations may be applied to encrypted instances of at least one of blocks, objects and files of the data from the data storage system 304. A deduplication decision of a given such deduplication operation may be based at least in part on metadata of the encrypted instances. In such an arrangement, the metadata illustratively comprises one or more data encryption keys of the encrypted instances, with the metadata being protected under a key encryption key.

In the FIG. 3 embodiment, the proxy containers 330 may be considered "privileged" containers. Each of the clustered secure data proxies 305 is implemented as a cluster of such privileged containers, and is therefore referred to as a clustered secure data proxy. In other embodiments, the secure data proxies need not be clustered. The privileged containers allow a given secure data proxy to mount storage volumes on underlying storage resources of the data storage system 304 and thereby expose the storage to "unprivileged" application containers 310. The application containers 310 can consume the exposed storage in a wide variety of different configurations. For example, such storage can be consumed as iSCSI targets, NAS servers or object storage URLs.

Configuring the clustered secure data proxies 305 to run in proxy containers helps to optimize resource utilization while also facilitating communication among cluster members. A given per-tenant clustered secure data proxy 305-1 or 305-2 will generally comprise proxy containers running on all of the container hosts which include one or more application containers for the corresponding tenant 325. Accordingly, each container host will generally comprise at least one proxy container so as to make sure that the applications on that same host are able to access data locally in a proxy container on that host. Such local access is illustratively via a file system mount or API and therefore provides efficient, low latency access. The proxy extensions associated with the respective application containers 310 ensure that the applications in those containers access data in the local proxy container on the same host, such that the tenant 325 can control the security of the data.

The portable managers 320 are isolated from the clustered secure data proxies 305 in order to provide management flexibility but as indicated previously numerous other arrangements are possible for these elements.

The clustered secure data proxies 305 of the FIG. 3 embodiment can be distributed across multiple distinct public clouds as in the FIG. 2 embodiment, although illustratively shown in FIG. 3 as being implemented in public cloud 302A.

As in the previous embodiments, the data obtained by a given one of the clustered secure data proxies 305 from the persistent storage in the data storage system 304 external to the public cloud 302A for storage in non-persistent storage of the secure data proxy is at no time stored in persistent storage of the public cloud 302A.

It should be noted that references above and elsewhere herein to container host devices should not be viewed as limiting in any way. Other embodiments can utilize other types of host devices, including virtual machines and "bare metal" hosts. The term "host device" as used herein is therefore intended to be broadly construed.

Figure 4:
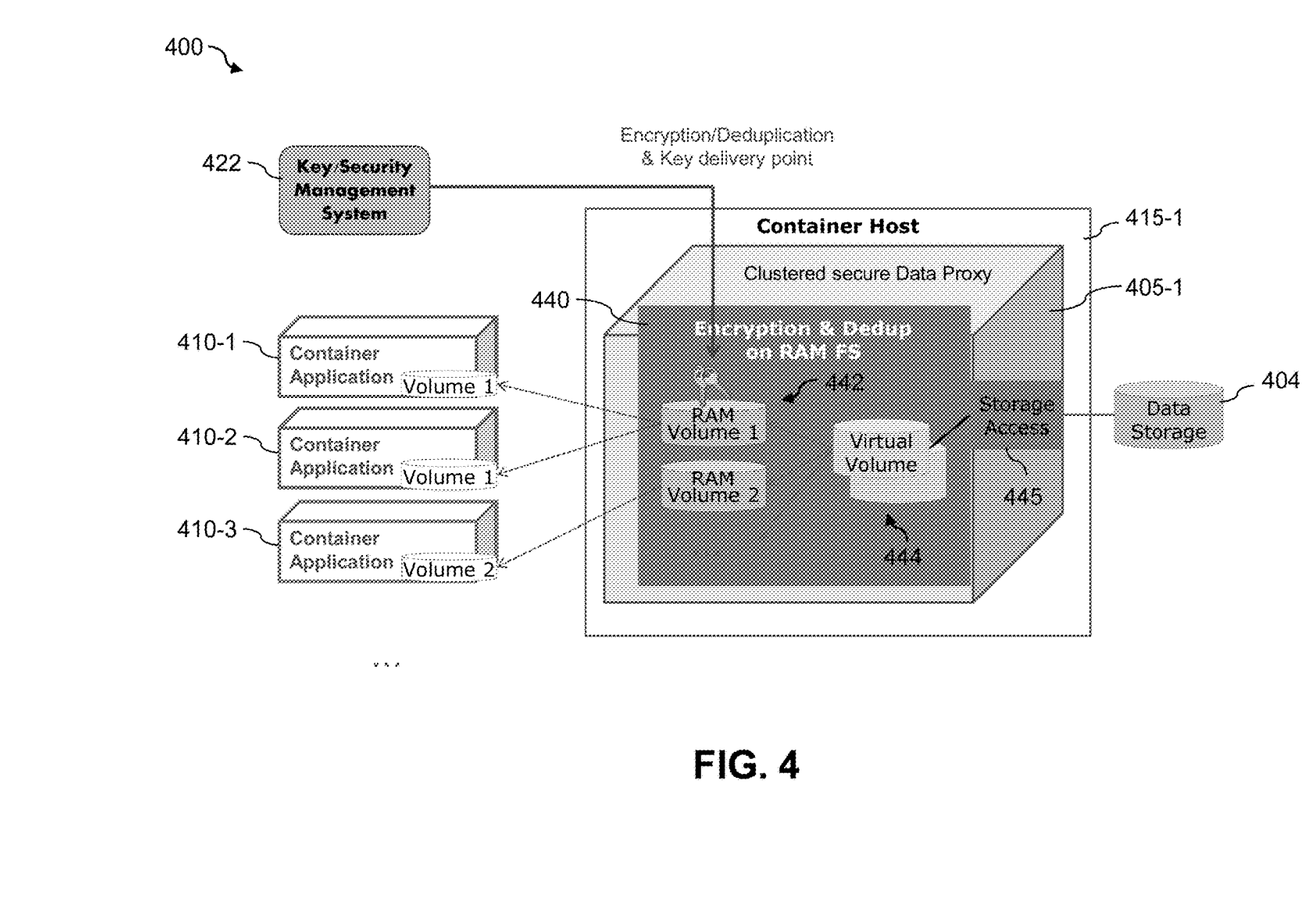

FIG. 4 shows another illustrative embodiment of an information processing system 400 comprising an external data storage system 404 that interacts with a portion of a clustered secure data proxy 405-1. The secure data proxy 405-1 supports transfer of data between the external data storage system 404 and a plurality of applications 410-1, 410-2 and 410-3. The applications 410 are assumed to run in containers that are supported by at least one container host 415-1 and are therefore also referred to as "container applications." The container host 415-1 is also assumed to comprise at least one proxy container that implements at least a portion of the secure data proxy 405-1. It is to be appreciated that although only a single container host 415-1 is shown in the figure, the system 400 illustratively includes multiple such container hosts and the application containers and the clustered secure data proxy 405-1 are assumed to be distributed across those multiple container hosts.

The secure data proxy 405-1 is configured to communicate with a key/security management system 422. The key/security management system 422 provides encryption keys to the secure data proxy 405-1. The secure data proxy 405-1 further comprises an encryption and deduplication module 440 that operates on non-persistent storage of a RAM file system (FS) comprising RAM volumes 442. The RAM volumes 442 are associated with virtual volumes 444 containing data transferred from the external data storage system 404 via a storage access point 445. The secure data proxy 405-1 provides the applications 410 with access to respective volumes corresponding to the RAM volumes 442. More particularly, applications 410-1 and 410-2 access a storage volume denoted Volume 1 and corresponding to RAM Volume 1 of the RAM volumes 442. Similarly, application 410-3 accesses a storage volume denoted Volume 2 and corresponding to RAM Volume 2 of the RAM volumes 442.

One possible example of encryption and deduplication functionality of a secure data proxy such as that described above is illustrated in FIGS. 5A and 5B. In this embodiment, information processing system 500 comprises a data storage system 504, a clustered RAM FS 512, a key/security management system 522 and a metadata server 524. The clustered RAM FS 512 is part of an encryption and deduplication module 540 of a secure data proxy. A deduplication module 550 of the encryption and deduplication module 540 interacts with the data storage system 504 and the key/security management system 522.

Figure 5A:
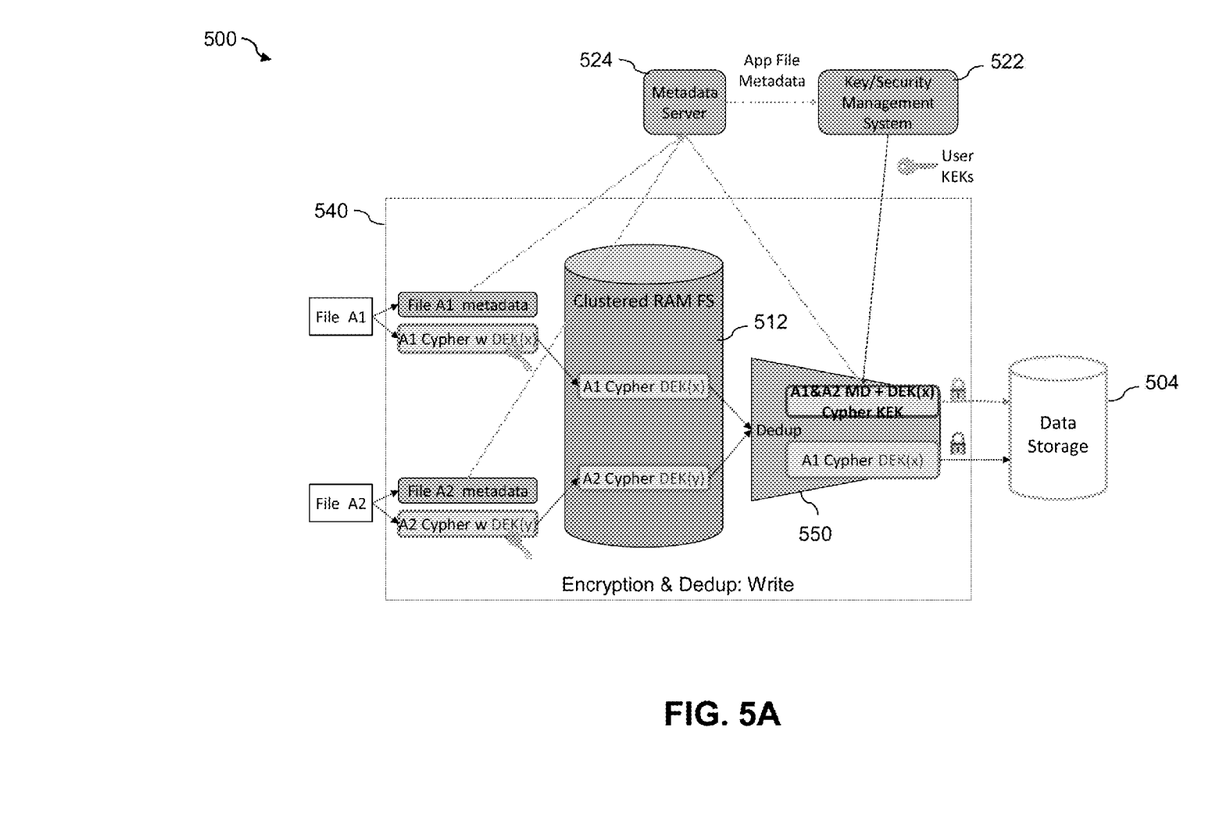
FIGS. 5A and 5B illustrate respective example write and read processes implemented in a secure data proxy in another embodiment.
Figure 5B:
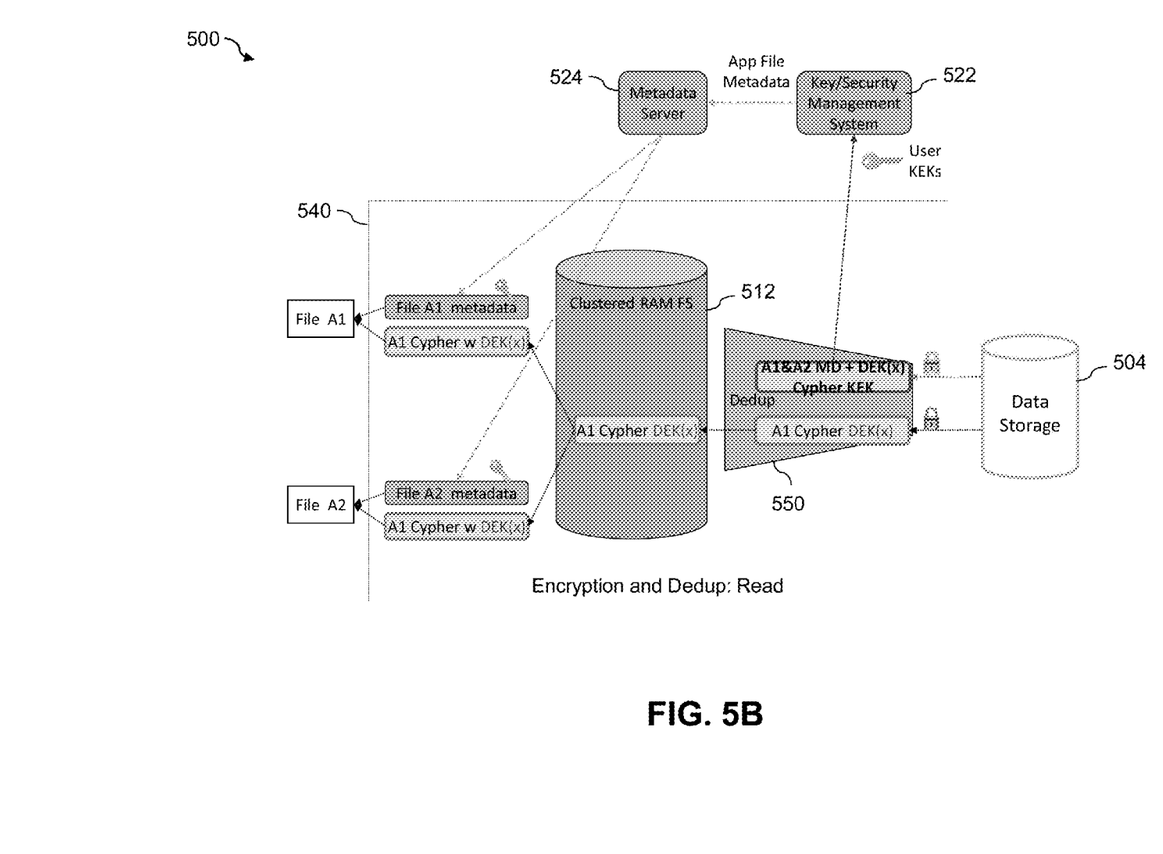

FIGS. 5A and 5B illustrate respective examples of write and read processes implemented in the secure data proxy comprising clustered RAM FS 512. In these examples, encryption and deduplication are assumed without limitation to be implemented at a file level, but it is possible in other embodiments to provide such functionality at another storage level such as a block level or an object level. It is further assumed that the files are protected at the secure data proxy using data encryption keys (DEKs) that are generated randomly for each file.

The per-file encryption metadata including file metadata and the DEK for the file are collected at the metadata server 524. The per-file encryption metadata are protected by a user key encryption key (KEK) that is generated by the key/security management system 522. Encryption and decryption of the metadata is performed by the key/security management system 522. In this embodiment, the data encryption mobility is at the file level, which means that each file can be encrypted at any secure data proxy as long as the secure data proxy can obtain the file metadata from the metadata server 524.

File deduplication is performed in this embodiment among all applications that the secure data proxy serves. The deduplication is applied to encrypted files and the deduplication decision is based on encrypted file metadata.

Referring now more specifically to FIG. 5A, a write process example of encryption and deduplication is shown for two identical files denoted A1 and A2. File A1 is encrypted using a first data encryption key denoted DEK(x) and file A2 is encrypted using a second data encryption key denoted DEK(y). Both encrypted files are non-persistently stored in the clustered RAM FS 512 of the secure data proxy as illustrated. The metadata server 524 processes the A1 and A2 metadata and from that metadata determines that files A1 and A2 are identical. The metadata server 524 then instructs the deduplication module 550 to store in the external data storage system 504 the encrypted file A1 rather than both encrypted file A1 and encrypted file A2. The encrypted file A2 in this example is considered the duplicate file and is therefore not persistently stored in data storage system 504. The deduplication module 550 instead sends only the encrypted file A1 together with the corresponding KEK-protected metadata to the persistent storage of the data storage system 504.

With reference now to FIG. 5B, a corresponding read process example of encryption and deduplication is shown. This read process involves the encrypted file A1 that was previously written to persistent storage of the data storage system 504 in FIG. 5A. The deduplication module 550 in this read process example receives the encrypted file A1 together with the corresponding KEK-protected metadata from persistent storage of the data storage system 504. The deduplication module 550 sends the KEK-protected metadata to the key/security management system 522 and stores the encrypted file A1 in the clustered RAM FS 512. The key/security management system 522 decrypts the KEK-protected metadata and sends the corresponding decrypted metadata to the metadata server 524. The metadata server 524 utilizes the decrypted metadata to decrypt the encrypted file A1. The decrypted file A1 with its corresponding file A1 metadata is provided to one or more applications using file A1. The decrypted file A1 is also provided as file A2 but with file A2 metadata to applications utilizing file A2.

The metadata in this example are per-file based and therefore the metadata server 524 supports per-file metadata storing and searching. The searching function could be based on either complete or partial metadata.

Other examples of encryption and deduplication functionality that can be performed at least in part by a secure data proxy of the type disclosed herein are described in U.S. patent application Ser. No. 14/819,920, filed Aug. 6, 2015 and entitled "Storage System Comprising Per-Tenant Encryption Keys Supporting Deduplication Across Multiple Tenants," which is incorporated by reference herein.

A given application in this and other embodiments can execute in its respective application container on a public cloud without any of its associated data being stored in persistent storage of that public cloud. Instead, data required for execution of the application is transferred from an external storage system into the non-persistent storage of the secure data proxy and corresponding modified data are subsequently transferred back from the non-persistent storage of the secure data proxy to the external storage system.

An arrangement of this type provides enhanced security for the data of an enterprise storage system when the corresponding enterprise utilizes the public cloud for application execution. For example, the above-described application execution does not require persistent storage of the data in the public cloud. Such arrangements can advantageously alleviate any security concerns that enterprises might otherwise have if they had to transfer their private data into persistent storage of a public cloud. Enterprises can therefore obtain the numerous benefits associated with cloud computation while also ensuring that their private data remains secure within an enterprise storage system and is never persistently stored within the public cloud.

Accordingly, illustrative embodiments can accommodate those enterprises that want to maintain strict control over their applications and data by avoiding any persistent storage thereof in an external cloud. The data can be pulled as needed over a secure connection from enterprise storage into non-persistent memory of a public cloud such as the above-described clustered RAM FS of the secure data proxy.

As noted above, the public cloud and other clouds referred to herein are illustratively implemented by cloud infrastructure comprising one or more processing platforms. Such cloud infrastructure illustratively implements virtualization techniques for implementing virtual machines. The virtualization techniques may include operating system level virtualization techniques such as Linux containers (LXCs). Additionally or alternatively, other types of virtual machines such as those implemented using a hypervisor can be used. The term "virtual machine" as used herein is intended to be broadly construed to encompass, for example, a container implemented using operating system level virtualization, a virtual machine implemented using a hypervisor, or combinations thereof, such as a container configured to run in a hypervisor-based virtual machine.

A given enterprise storage system or other type of external storage system referred to herein is illustratively implemented by one or more storage platforms.

The term "storage platform" as used herein is intended to be broadly construed so as to encompass at least one storage array, at least one storage fabric or a combination of multiple instances of one or more of these and other types of storage devices and systems. For example, a given storage platform can comprise any of a variety of different types of storage including network-attached storage (NAS), storage area networks (SANs), direct-attached storage (DAS), distributed DAS and software-defined storage (SDS), as well as combinations of these and other storage types.

Storage platforms of the type described above may be part of a processing platform that also implements cloud infrastructure. Portions of a given processing platform in some embodiments can comprise converged infrastructure such as VxRail™, VxRack™ or Vblock® converged infrastructure commercially available from VCE, the Virtual Computing Environment Company, an EMC Federation Company. For example, portions of at least one cloud or an associated enterprise storage system of the type disclosed herein can be implemented utilizing converged infrastructure.

Secure data proxy functionality such as that described in conjunction with the embodiments of FIGS. 1-5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

The illustrative embodiments of FIGS. 1-5 advantageously facilitate the use of cloud computing by enterprises by allowing applications to execute in a public cloud while the data utilized by those applications remains securely stored in an enterprise storage system and is not persistently stored in the public cloud.

Enterprises with sensitive data, such as financial institutions, insurance companies and healthcare companies, can utilize the disclosed techniques to take advantage of external cloud computing resources without requiring that the data be moved to persistent storage of the external cloud. Such enterprises can retain full control of the particular manner in which their applications and data are utilized in the external cloud.

In addition, illustrative embodiments facilitate secure data federation, in which multiple distinct entities have data sets that are more valuable when used together for computation, but cannot be migrated. Examples of contexts in which such secure data federation is important include genomic processing, oil & gas exploration and other computation-intensive processing contexts using geographically-distributed data sets.

Illustrative embodiments can also facilitate the deployment of new applications in cloud infrastructure. These include applications that process data from multiple tenants, applications involving worldwide data in many clouds and locations, applications running worldwide in many clouds and locations, and applications requiring the same complete lifecycle control as their corresponding secure data.

Some embodiments are configured to support a converged infrastructure licensing model in which external compute resources are made available to enterprises for running applications using data that is persistently stored only in the storage systems of the respective enterprises and not in the clouds providing the external compute resources.

It should be noted that the particular arrangements of components in the systems of FIGS. 1-5 are presented by way of illustrative example only, and should not be construed as limiting in any way. As noted above, the described functionality can be implemented using additional or alternative components. Accordingly, a wide variety of different secure data access configurations can be used in other embodiments.

For example, a secure data proxy of the type disclosed herein can be implemented in numerous other information processing system configurations, including those system configurations described in U.S. patent application Ser. No. 15/268,788, filed Sep. 19, 2016 and entitled "Secure Data Access in Cloud Computing Environments," which is incorporated by reference herein.

The illustrative embodiments described above provide significant advantages over conventional arrangements.

For example, a secure data proxy in an illustrative embodiment provides container-based cloud applications with secure and efficient access to persistent data with high performance regardless of where the applications are running relative to the persistent data location. The secure data proxy supports additional functionality such as encryption and data deduplication in direct proximity to the applications. The secure data proxy can be configured in some embodiments to provide movement and caching of only the minimal amount of required data to applications running in the cloud, thereby conserving system bandwidth and other resources that might otherwise be expended in conventional data transfer.

The illustrative embodiments facilitate effective separation of cloud computation from enterprise storage. This allows compute-only utilization of a public cloud or other type of cloud so as to ensure a high level of security for private data of an enterprise. As a result, a given enterprise can securely run its applications in the cloud utilizing private data that is persistently stored in an enterprise storage system external to the cloud but not persistently stored in the cloud itself.

It is to be appreciated that the foregoing advantages are illustrative of advantages provided in certain embodiments, and need not be present in other embodiments.

It should be understood that the particular sets of modules and other components implemented in the information processing systems as described above are presented by way of example only. In other embodiments, only subsets of these components, or additional or alternative sets of components, may be used, and such components may exhibit alternative functionality and configurations. For example, numerous alternative cloud computing environments can be configured to implement secure data access using application launchers, applications and data proxies as disclosed herein.

Functionality such as that described in conjunction with the diagrams of FIGS. 1 through 5 can be implemented at least in part in the form of one or more software programs stored in memory and executed by a processor of a processing device such as a computer or server. A memory or other storage device having executable program code of one or more software programs embodied therein is an example of what is more generally referred to herein as a "processor-readable storage medium."

Communications between the various elements of an information processing system as disclosed herein may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

The particular processing platforms described above are presented by way of example only, and a given information processing system such as system 100 may include additional or alternative processing platforms, as well as numerous distinct processing platforms in any combination, with each such platform comprising one or more computers, servers, storage devices or other processing devices.

Such information processing system components can communicate with other system components over any type of network or other communication media.

It should again be emphasized that the above-described embodiments of the invention are presented for purposes of illustration only. Many variations and other alternative embodiments may be used. For example, the disclosed techniques are applicable to a wide variety of other types and arrangements of information processing systems, cloud computing environments, storage systems, applications, secure data proxies and other elements or components. Also, the particular configurations of system and device elements shown and described in conjunction with the illustrative embodiments of in FIGS. 1-5 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   a plurality of host devices configured to support execution of applications on behalf of one or more tenants of cloud infrastructure; and
   a secure data proxy implemented utilizing at least one of the host devices;
   wherein the secure data proxy comprises non-persistent storage configured to store data required for execution of at least one of the applications;
   wherein the data is obtained by the secure data proxy from persistent storage in a storage system external to the cloud infrastructure;
   wherein the secure data proxy is configured to perform cryptographic operations in conjunction with transfer of the data between the persistent storage of the external storage system and the non-persistent storage of the secure data proxy; and
   wherein the secure data proxy comprises a clustered secure data proxy implemented utilizing a cluster of proxy containers provided by respective ones of the host devices and wherein applications executing in respective application containers of respective ones of the host devices are each able to locally access the corresponding proxy container provided by that host device;
   the host devices being implemented on at least one processing platform comprising a processor coupled to a memory.

2. The apparatus of claim 1 wherein the cloud infrastructure comprises a plurality of clouds each comprising a plurality of host devices and the secure data proxy is implemented in a distributed matter utilizing one or more of the host devices in each of multiple ones of the clouds of the cloud infrastructure.

3. The apparatus of claim 1 wherein the non-persistent storage of the secure data proxy comprises random access memory.

4. The apparatus of claim 1 wherein the host devices comprise respective container host devices and the applications execute in respective application containers implemented utilizing the container host devices.

5. The apparatus of claim 1 wherein a given one of the application containers comprises a proxy extension through which that application container communicates with the proxy container on the same host device.

6. The apparatus of claim 1 wherein the secure data proxy interacts with the storage system to transfer the data required for execution of the application into the non-persistent storage of the secure data proxy and to transfer corresponding modified data back from the non-persistent storage of the secure data proxy to the storage system.

7. The apparatus of claim 1 wherein the secure data proxy is configured to mount one or more storage volumes from the external storage system and to expose at least portions of the one or more mounted storage volumes to one or more application containers in which at least one of the applications executes.

8. The apparatus of claim 1 wherein the secure data proxy comprises a first secure data proxy associated with a first tenant of the cloud infrastructure and the apparatus further comprises one or more additional secure data proxies associated with respective additional tenants of the cloud infrastructure.

9. The apparatus of claim 1 wherein the data obtained by the secure data proxy from the persistent storage in the storage system external to the cloud infrastructure for storage in the non-persistent storage of the secure data proxy is at no time stored in persistent storage of the cloud infrastructure.

10. The apparatus of claim 1 further comprising a key management system accessible to the secure data proxy and configured to provide cryptographic keys to the secure data proxy for performing the cryptographic operations wherein the cryptographic keys comprise data encryption keys utilized for encrypting respective instances of at least one of blocks, objects and files of the data.

11. The apparatus of claim 10 further comprising a metadata server accessible to the secure data proxy and configured to provide metadata to the secure data proxy for performing the cryptographic operations and wherein encryption of the metadata under a key encryption key is performed by the key management system.

12. The apparatus of claim 1 wherein the secure data proxy is further configured to perform deduplication operations in conjunction with transfer of the data between the persistent storage of the external storage system and the non-persistent storage of the secure data proxy.

13. The apparatus of claim 12 wherein one or more of the deduplication operations are applied to encrypted instances of at least one of blocks, objects and files of the data and a deduplication decision of a given such deduplication operation is based at least in part on metadata of the encrypted instances wherein the metadata comprises one or more data encryption keys of the encrypted instances and wherein the metadata is protected under a key encryption key.

14. A method comprising:
configuring a plurality of host devices to support execution of applications on behalf of one or more tenants of cloud infrastructure; and
implementing a secure data proxy utilizing at least one of the host devices;
wherein the secure data proxy comprises non-persistent storage configured to store data required for execution of at least one of the applications;
wherein the data is obtained by the secure data proxy from persistent storage in a storage system external to the cloud infrastructure;
wherein the secure data proxy is configured to perform cryptographic operations in conjunction with transfer of the data between the persistent storage of the external storage system and the non-persistent storage of the secure data proxy; and
wherein the secure data proxy comprises a clustered secure data proxy implemented utilizing a cluster of proxy containers provided by respective ones of the host devices and wherein applications executing in respective application containers of respective ones of the host devices are each able to locally access the corresponding proxy container provided by that host device;
the method being performed by at least one processing platform comprising a processor coupled to a memory.

15. The method of claim 14 wherein a key management system accessible to the secure data proxy is configured to provide cryptographic keys to the secure data proxy for performing the cryptographic operations wherein the cryptographic keys comprise data encryption keys utilized for encrypting respective instances of at least one of blocks, objects and files of the data.

16. The method of claim 14 wherein the cloud infrastructure comprises a plurality of clouds each comprising a plurality of host devices and the secure data proxy is implemented in a distributed matter utilizing one or more of the host devices in each of multiple ones of the clouds of the cloud infrastructure.

17. A computer program product comprising a non-transitory processor-readable storage medium having stored therein program code of one or more software programs, wherein the program code when executed by at least one processing platform comprising a processor coupled to a memory causes the processing platform:
to configure a plurality of host devices to support execution of applications on behalf of one or more tenants of cloud infrastructure; and
to implement a secure data proxy utilizing at least one of the host devices;
wherein the secure data proxy comprises non-persistent storage configured to store data required for execution of at least one of the applications;
wherein the data is obtained by the secure data proxy from persistent storage in a storage system external to the cloud infrastructure;
wherein the secure data proxy is configured to perform cryptographic operations in conjunction with transfer of the data between the persistent storage of the external storage system and the non-persistent storage of the secure data proxy; and
wherein the secure data proxy comprises a clustered secure data proxy implemented utilizing a cluster of proxy containers provided by respective ones of the host devices and wherein applications executing in respective application containers of respective ones of the host devices are each able to locally access the corresponding proxy container provided by that host device.

18. The computer program product of claim 17 wherein a key management system accessible to the secure data proxy is configured to provide cryptographic keys to the secure data proxy for performing the cryptographic operations wherein the cryptographic keys comprise data encryption keys utilized for encrypting respective instances of at least one of blocks, objects and files of the data.

19. The computer program product of claim 18 further comprising a metadata server accessible to the secure data proxy and configured to provide metadata to the secure data proxy for performing the cryptographic operations and wherein encryption of the metadata under a key encryption key is performed by the key management system.

20. The computer program product of claim 17 wherein the cloud infrastructure comprises a plurality of clouds each comprising a plurality of host devices and the secure data proxy is implemented in a distributed matter utilizing one or more of the host devices in each of multiple ones of the clouds of the cloud infrastructure.

* * * * *